United States Patent [19]

Rayburn et al.

[11] 4,181,552

[45] Jan. 1, 1980

[54] MACHINE AND METHOD FOR FORMING A PLEATED AND WOUND ELECTRICAL CAPACITOR WITH A METALLIZED DIELECTRIC

[75] Inventors: Charles C. Rayburn, Mount Prospect; Robert V. Enstrom, Oak Park, both of Ill.

[73] Assignee: Illinois Tool Works Inc., Chicago, Ill.

[21] Appl. No.: 898,583

[22] Filed: Apr. 21, 1978

[51] Int. Cl.² .................................................. B31F 1/34
[52] U.S. Cl. ................................... 156/204; 29/25.42; 156/462; 156/474; 242/56.1; 270/40
[58] Field of Search .............. 156/462, 461, 204, 474, 156/444; 270/40–41, 66, 69, 86, 94; 93/84 R, 60, 84 FF; 223/28, 34; 29/25.42; 242/56.1

[56] References Cited

U.S. PATENT DOCUMENTS

| | | | |
|---|---|---|---|
| 1,046,325 | 12/1912 | Normand | 270/40 |
| 1,085,948 | 2/1914 | Smith | 223/28 X |
| 1,104,415 | 7/1914 | Cottini et al. | 270/86 |
| 1,107,265 | 8/1914 | Cohen | 270/86 |
| 1,402,584 | 1/1922 | Elrod | 223/34 |
| 1,612,614 | 12/1926 | Collins | 156/204 X |
| 1,747,367 | 2/1930 | Hohl | 270/94 |
| 1,753,764 | 4/1930 | Willard | 270/41 |
| 1,758,033 | 5/1930 | Dodge | 270/41 |
| 1,759,844 | 5/1930 | Gudge et al. | 270/94 |
| 1,884,783 | 10/1932 | Marchlus | 270/86 |
| 1,940,847 | 12/1933 | Danziger | 242/56.1 |
| 2,039,335 | 5/1936 | Nall | 270/94 |
| 2,068,133 | 1/1937 | Hindall | 156/462 |
| 2,213,602 | 9/1940 | Yates | 93/3 |
| 2,314,757 | 3/1943 | Benedict | 156/462 |
| 2,328,520 | 8/1943 | West | 242/56.1 |
| 2,538,671 | 1/1951 | Crowe | 270/40 |
| 2,565,301 | 8/1951 | Foster et al. | 29/25.42 |
| 2,786,616 | 3/1957 | Cady | 223/34 |
| 2,873,965 | 2/1959 | Mitchell | 270/40 |
| 2,882,586 | 4/1959 | Shen | 29/25.42 |
| 2,908,494 | 10/1959 | Brodie | 270/86 X |
| 3,002,256 | 10/1961 | Moore | 29/25.42 |
| 3,038,718 | 6/1962 | Balsam | 270/40 |
| 3,058,684 | 10/1962 | Wellington | 242/56.1 |
| 3,058,685 | 10/1962 | Kitler | 242/56.7 |
| 3,073,008 | 1/1963 | McGraw | 29/25.42 |
| 3,147,009 | 9/1964 | Gram | 270/86 |
| 3,212,163 | 10/1965 | Robinson | 29/25.42 |
| 3,286,435 | 11/1966 | Weinburger | 53/117 |
| 3,348,458 | 10/1967 | Tipper | 93/84 |
| 3,425,641 | 2/1969 | Gallet et al. | 242/56.1 |
| 3,460,825 | 8/1969 | Mets | 270/61 |
| 3,518,810 | 7/1970 | Steeves | 270/94 X |
| 3,536,317 | 10/1970 | Billett | 270/40 |
| 3,917,254 | 11/1975 | Watrous | 270/86 |
| 3,985,599 | 10/1976 | Lepoutre et al. | 156/164 |
| 3,985,600 | 10/1976 | Blais | 156/229 |
| 3,991,994 | 11/1976 | Farish | 270/73 |
| 4,128,926 | 12/1978 | Gaenge et al. | 242/56.1 X |

FOREIGN PATENT DOCUMENTS 2146013  3/1973  Fed. Rep. of Germany ............. 270/86
2634442  2/1978  Fed. Rep. of Germany .

Primary Examiner—David A. Simmons
Attorney, Agent, or Firm—Glenn W. Bowen; Robert W. Beart

[57] ABSTRACT

A machine and a method are disclosed for forming pleated and wound electrical capacitors having a metallized dielectric which is metallized on both sides to form electrodes thereon. The metallized dielectric material is fed from supply rollers and it is pulled tightly over one or more rotatable discs so that it is locked firmly onto the periphery thereof. In one embodiment, three rotatable discs are employed and the center disc projects beyond the other two discs which are aligned at acute angles with respect to the center disc. After the dielectric material leaves these discs, it passes through a low pressure air stream which smooths out the wrinkles in the material. It is then fed under tension around a substantial portion of the periphery of a relatively large winding wheel. A winding mandrel engages a point on the periphery of the winding wheel and receives the free end of the metallized dielectric material so that the pleated metallized dielectric material is still under tension when it is received by the mandrel. The mandrel and the winding wheel are moveable relative to each other as the capacitor builds up on the mandrel. In another alternate version, a fixed mandrel is employed and a second moveable winding wheel is positioned intermediate the first winding wheel and the mandrel in a manner such that tension is maintained on the metallized dielectric material as it is wound onto the mandrel.

24 Claims, 7 Drawing Figures

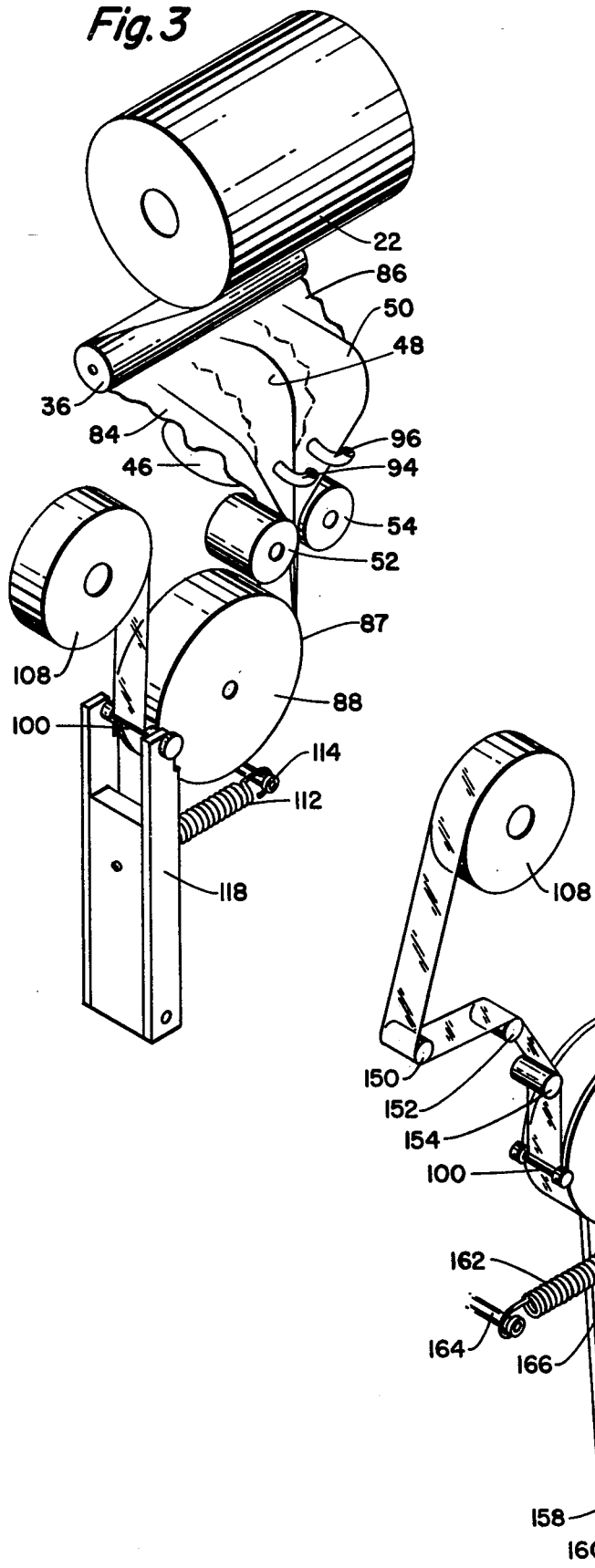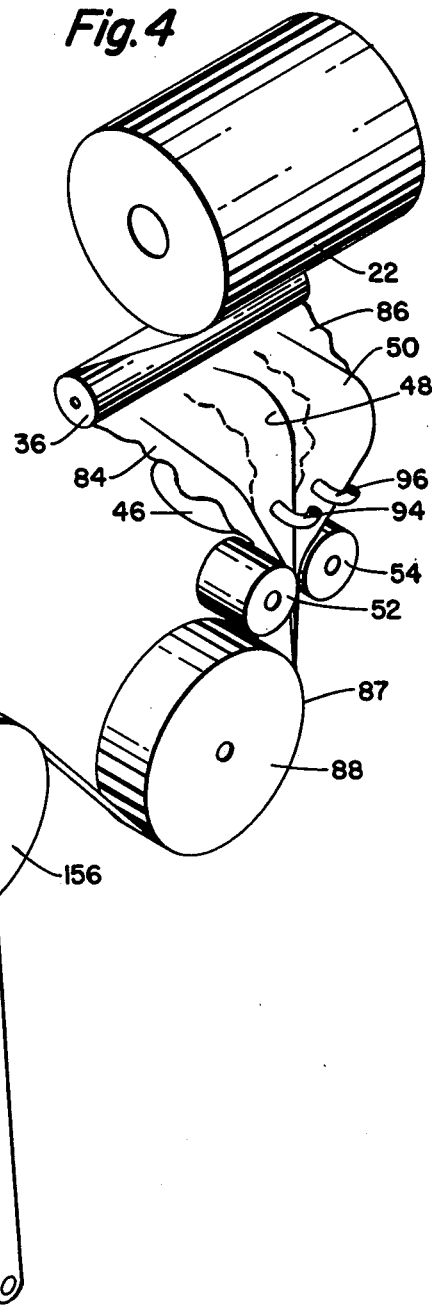

MACHINE AND METHOD FOR FORMING A PLEATED AND WOUND ELECTRICAL CAPACITOR WITH A METALLIZED DIELECTRIC

BACKGROUND OF THE INVENTION

Numerous machines have been developed for the pleating of the various materials, but these machines were not generally useful for the multiple longitudinal pleating and winding of very thin, very fragile material; such as, for example, metallized dielectric materials that are used in the production of wound film electrical capacitors. Such metallized dielectric material may range in thickness from, for example, 0.0001 inches to 0.004 inches or more, and it may be of a plastic material such as polyethylene, polyprotylene, and polycarbonate. The metallized electrode surfaces of these dielectric materials are many times thinner than their supporting dielectric layer; and consequently, they are very easily damaged. Furthermore, in the construction of a pleated and wound capacitor, it is essential that substantially all wrinkles be eliminated, and thus the pleating process must be done very delicately so that portions of the metallized area are not removed or damaged. The present invention accomplishes the above objectives in a relatively simple and uncomplicated manner, and it should also prove useful for the pleating and winding of materials for various other applications.

The making of electrical capacitors which utilize a metallized dielectric material that is pleated in order to provide improved reliability and enhanced electrical characteristics was proposed in U.S. Pat. No. 2,470,826, issued on May 24, 1949 to W. McMahon. The McMahon patent illustrated a capacitor in which a two-sided metallized dielectric layer was folded an odd number of times in a longitudinal direction. The folded dielectric material of the McMahon patent was then wound to form a capacitor segment, and end terminations were applied by the spraying of metal against the edges of the wound capacitor segment. The type of capacitor described by the McMahon patent is an extremely desirable one because substantially all of the dielectric layer of the capacitor is in the electric field. This type of capacitor may also be made without the insertion of an additional dielectric layer in the main body of the capacitor, although a short initial unmetallized dielectric strip and a protective terminating dielectric strip may be employed to advantage with this type of capacitor, if desired. While the McMahon patent described a new and improved type of capacitor, it did not describe any method, or machine, by which such a capacitor could be commercially produced.

Australian Patent No. 159,958, patented Nov. 24, 1965, was also directed to the construction of a pleated and wound metallized capacitor in which unmetallized dielectric strips were provided behind each pleat of the capacitor. The purpose of these unmetallized strips was to provide a method of attaching leads to the pleated metallized dielectric capacitor so that when conductive termination material was sprayed onto the edges of the capacitor, the sprayed material would not pierce through the dielectric layer, thereby causing a shorting of the two electrodes together. The Australian Patent, however, also failed to show any method, or machine, by which such a capacitor could be constructed, other than by manual folding.

The present invention may be used to construct wound and pleated capacitors, such as those described in the previously mentioned McMahon and Australian patents, or in any of the following co-pending patent applications all of which are assigned to the assignee of the present invention and all of which were filed in the name of Charles C. Rayburn:

| U.S. PATENT APPLICATION SERIAL NO. | FILING DATE | ENTITLED |
| --- | --- | --- |
| 814,958 | July 12, 1977 | Pleated Metallized Film Capacitor with Sprayed End Terminations |
| 814,945 | July 12, 1977 | Single Pleat Metallized Film Capacitor with Separated Edge Terminations |
| 814,955 | July 12, 1977 | Pleated Metallized Film Capacitor with Staggered Edges |
| 814,954 | July 12, 1977 | Pleated Metallized Film Capacitor Wound About Its Center |

DESCRIPTION OF THE DRAWINGS

The present invention is described herein by reference to the following drawings in which:

FIG. 3 is a diagramatic illustration of one embodiment of the present invention employing a fixed winding wheel and a moveable winding mandrel;

FIG. 4 is a diagramatic showing of an alternate embodiment in which a fixed mandrel and a second winding wheel, which is moveable, is employed;

TECHNICAL DESCRIPTION OF THE INVENTION

Figure 1:
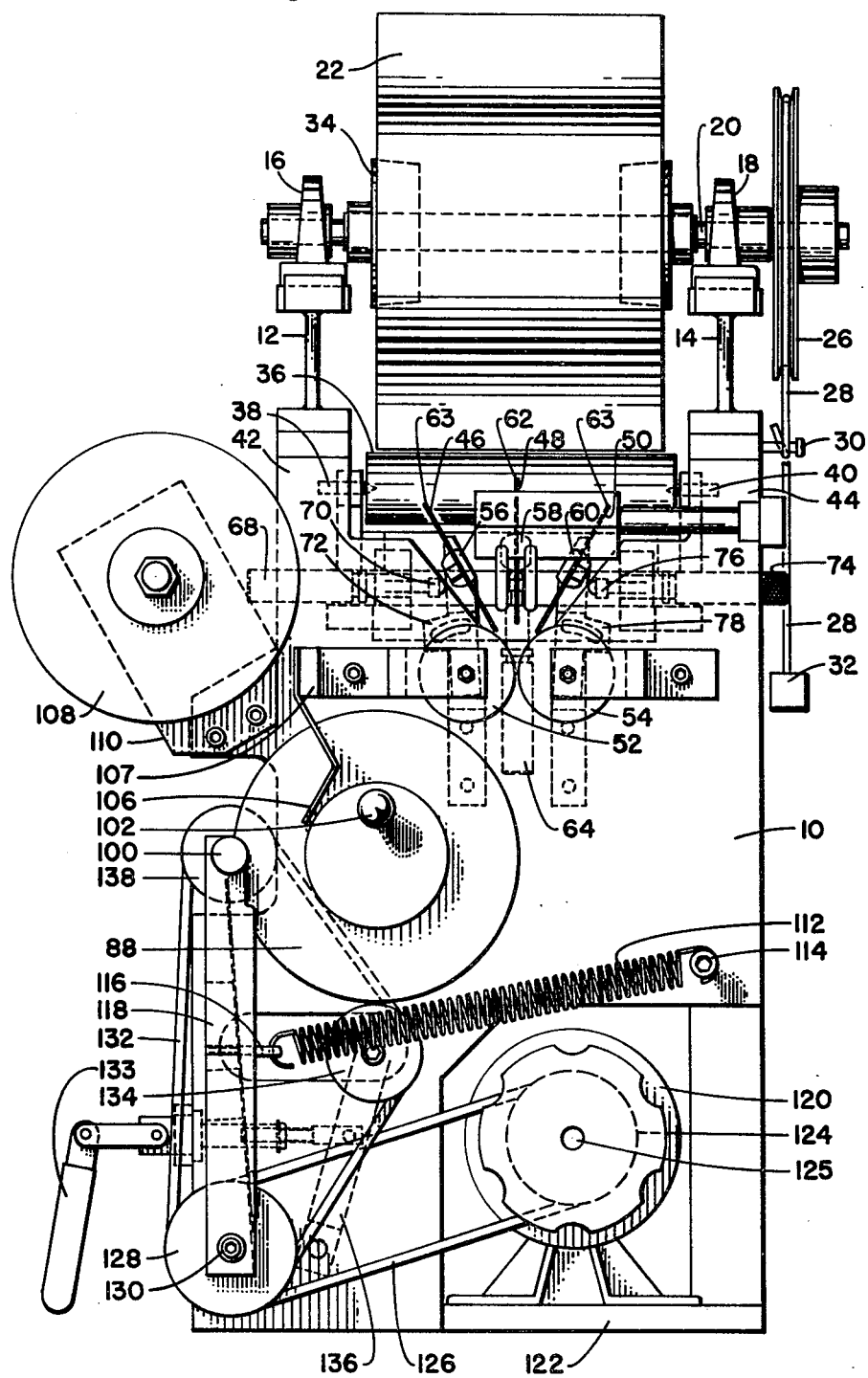
FIG. 1 is a front view of a winding machine in accordance with the present invention.
Figure 2:
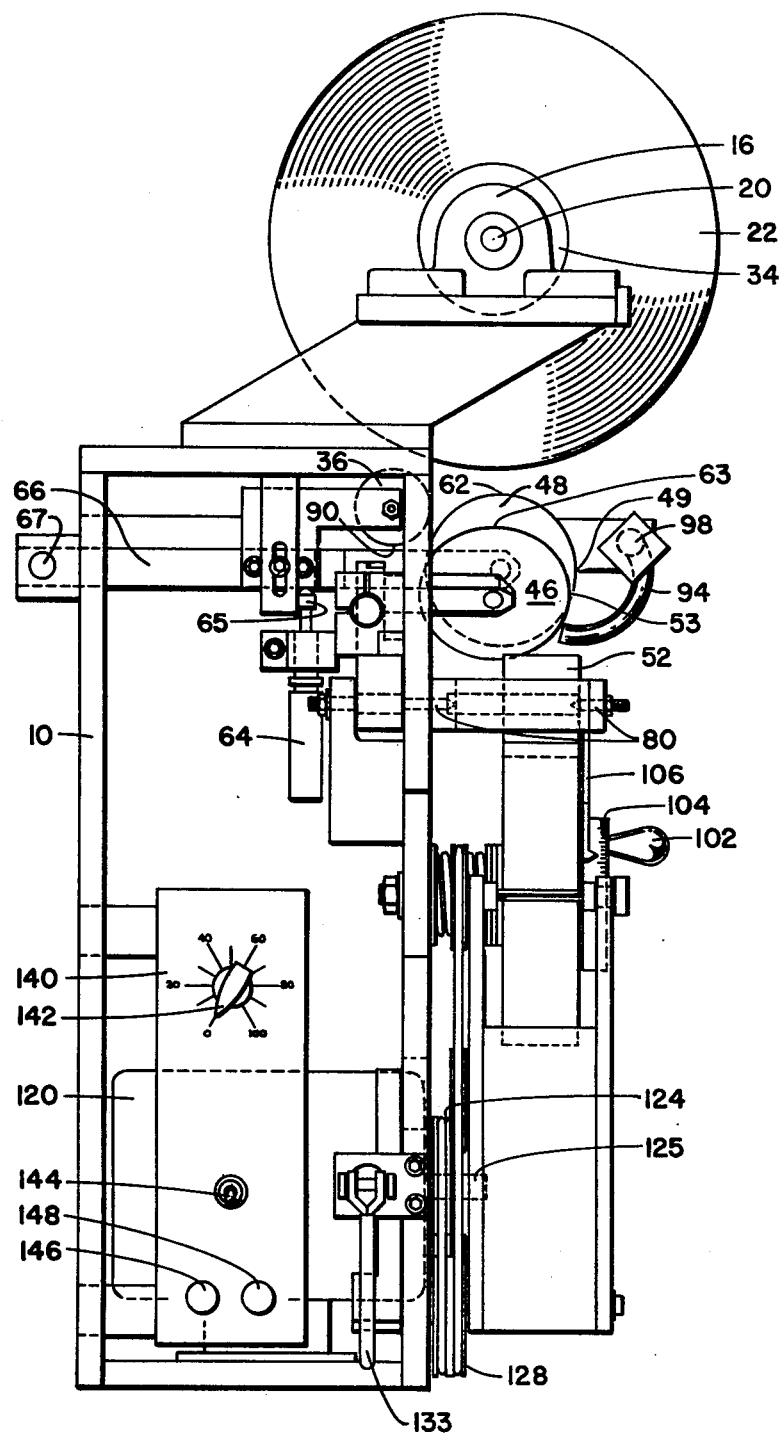
FIG. 2 is a side view of the winding machine of FIG. 1.

Front and side views of a machine that is constructed in accordance with the present invention for the winding and the pleating of a thin double-sided metallized dielectric material, which may be used to produce electrical capacitors are shown in FIGS. 1 and 2, respectively. The machine consists of a frame 10 which supports the other structures of the machine. At the top of the frame, a pair of braces 12, 14, are employed to bearing housings 16 and 18, respectively. The bearing housings, 16 and 18, encase bearings which receive a shaft 20 that supports a supply roll 22 of metallized dielectric material. The right hand end of the shaft 20 extends through the bearing housing 18 and is received by, and supports, a pulley 26. The pulley 26 has a cord, or resilient tube, 28 wrapped around it which is secured at one end to a bolt or a peg 30 that is in turn secured to the frame 10. The other end of the tube 28 is secured to a freely hanging weight 32 which applies tension to the cord 28. Sufficient tension is applied to the cord 28 to allow the metallized dielectric material to be supplied from the supply roll 22 in a continuous, substantially, a wrinkle-free manner. When the supply roll 22 of metallized dielectric material has been depleted, the spool 34 on which it was initially wound is removed from the shaft 20 and a new spool and new roll of metallized dielectric material is then inserted on the shaft.

The metallized dielectric material after leaving the front side of the supply roll 22 passes in back of and under an idler supply roller 36 (as best shown in FIGS. 3 and 4). The idler supply roller 36 is of a substantially smaller diameter than the initial diameter of the supply roll 22, and it assists in maintaining the dielectric material under tension. The idler supply roller 36 is supported on the centers 38, 40 (FIG. 1) which are supported by the raised ledges 42, 44 from which the braces 12, 14 extend. The metallized dielectric material from the supply roll 22 after passing under the idler supply roller 36 is then pulled up and over three rotatable discs 46, 48 and 50, in the embodiment of FIGS. 1 and 2, to start the pleating process. After passing up and over the rotatable discs 46, 48 and 50, the metallized dielectric material then continues down between spaced apart idler rollers 52, 54 which guide, but do not pinch, the dielectric material. The discs 46, 48 and 50 are all freely rotatable in their bearing structure 56, 58 and 60, respectively. The two outer discs 46, 50 are aligned at acute angles, but in opposite rotational senses, with respect to the center disc. The center disc 48 is preferably positioned so that the uppermost point 62 (best shown in FIG. 2) of its periphery extends beyond the uppermost point 63 of the peripheries of the angled discs 46, 50. The purpose of this extension is to allow the material passing over each of the discs to be of equal length between the point 90 (FIG. 2) and the point 87 (FIG. 7) to minimize creasing or wrinkling of the dielectric material.

In the capacitor of this previously mentioned Rayburn patent application Ser. No. 814,958, the center pleat preferably has a longitudinal unmetallized strip that runs behind the pleat so that when metallized conductive material is sprayed against the edges of the pleat, the inner and outer electrodes will not be shorted out if the spray penetrates through the dielectric material at the pleat. In the embodiment shown, the forwardmost portions 49 of the center disc 48 extends beyond the forwardmost portion 53 of the discs 46, 50 to provide for the extension of the center pleat of the capacitor beyond the other two pleats for a capacitor made in accordance with the above-mentioned Rayburn application. The forwardmost portion 49 of the periphery of center disc 48 of the illustrated machine could, therefore, be positioned on the same line as the forwardmost portion 53 of the discs 46, 50, if desired. A micrometer screw adjustment means 64 is provided which carries a head 65 that bears against a pivoted rod 66 which is pivoted about the pivot point 67 and which supports the disc 48 so that the vertical position of the central disc may be accurately adjusted thereby.

The angles that the discs 46, 50 make with the center disc 48 may be adjusted, but in the preferred embodiment these angles are fixed. However, the relative spacing of the discs 46, 50 from the center disc 48 is adjustable for different widths of material. The adjustment mechanism for the disc 46 consists of a micrometer screw adjustment means 68 which carries a head 70 that bears against a pivotable arm 72 that supports the disc 46. In a similar manner, a micrometer screw adjustment means 74 carries a head 76 which bears against the pivotal arm 78 that supports the disc 50 to provide the desired adjustments.

The idler roller wheels 52, 54 serve to guide the pleated material as it passes downwardly after leaving the discs 46, 48, and 50. These roller wheels are spaced apart so that the dielectric material freely moves past them, and is not pinched thereby. The roller wheel 52 is mounted between the centers 80 and while roller wheel 54 is also mounted between identical centers (not shown), but both of these idler roller wheels are rotated as a result of the friction of the dielectric material as it passes them, but the roller wheels 52, 54 do not exert any substantial folding force on the dielectric material due to their relatively wide spacing.

The dielectric material is blocked tightly onto the rotatable discs 46, 48, and 50 as it passes over them; and in this manner, the accurate spacing is maintained between the pleats of the completed capacitor. Small portions of the edges 84, 86 of the metallized dielectric material overlap the outer discs 46, 50, respectively, (as shown in FIG. 3) when the specific embodiment illustrated in FIGS. 1 and 2 is implemented. These edge portions 84, 86 provide a uniform even edge for the finished pleated capacitor since the dielectric material after passing the idler roller wheels 52, 54 is pulled under tension around a relatively large diameter winding wheel 88. It is actually at the point 87, where the dielectric material initially contacts the winding wheel, that the pleat of the dielectric material is finally accomplished due to the tension that is applied to the dielectric material as it is pulled around the winding wheel 88. It has been found that completing the pleats at the roller wheels 52, 54 by reducing the gap between the roller wheels and actually pinching the material between them, rather than at the point 87, introduces creases in the dielectric material that are carried around the winding wheel 88 and will, therefore, appear in the completed capacitor, and can deleteriously effect the electrical characteristics of the finished product. It should also be noted that the lowermost point 90 of the periphery of the idler supply roller 36 (FIG. 2) is below the uppermost points 63 of the angled discs 46, 50 so when the dielectric material is pulled up and over the disc this difference in height between the lowermost point of the idler supply roller and the uppermost points of the discs 46, 48, and 50 will serve to stretch and tightly lock the dielectric material onto the periphery of these discs.

Before the dielectric material passes between the idler roller wheels 52, 54, it moves past a pair of hollow supply tubes 94, 96 which are connected to an air supply inlet 98 from an air supply (not shown). This combination of air supply tubes 94, 96 and air supply helps to eliminate wrinkles in the dielectric material by directing a low pressure air stream against the material as it moves near the ends of the tubes 94, 96. One of the supply tubes 94 has its opening directed to the area between the discs 46 and 48, while the other tube 96 has its opening directed to the area between the disc 48 and the disc 50. The air tubes 94, 96 may be curved so that they are directed in a slightly upward direction, as shown in FIG. 2, or they could be straight tubes which are directed downwardly to a point just below the discs with which they are associated, if desired. The low pressure air stream that is supplied may vary from a few ounces of air pressure per square inch up to approximately ten pounds of air pressure per square inch, but the actual amount of air pressure is not critical.

In order to complete the winding of the capacitor, a conventional split mandrel 100 is desirably employed. A split mandrel is used so it may be opened to receive the free end of the dielectric material from the supply roll 22. The mandrel is then rotated to complete the winding of the capacitor. In alternate version, a plastic core or tube may replace the mandrel and the capacitor may be wound directly on the plastic core so that the core remains in the capacitor when completed. In the illustrated embodiment of FIGS. 1 and 2, the winding wheel 88 is connected to a hand crank 102 and it has indicator markings 104 associated with it. An indicating finger 106 is mounted on the block 107 so as to allow the operator to keep track of the number of turns that he has made of the winding wheel. A second supply roll 108 of an unmetallized dielectric material, which also may be used in the production of the capacitor, is supported on a bracket 110. Material from the supply roll 108 may be used to form an initial winding around the mandrel in order to protect the initial portion of the metallized dielectric material that is wound onto it; and in addition, an outer heat sealable protective layer may also be supplied from the supply roll 108 to complete the formation of the wound capacitor segment.

In the embodiment illustrated by FIGS. 1, 2, and 3, the machine winds the desired capacitor segment while the mandrel 100 is forced against the winding wheel 88 so that the metallized dielectric material traverses around the winding wheel under tension and in contact with the wheel 88 until the point at which it is received by the split mandrel 100. The outer layer of the dielectric material that is wound on the mandrel 100 thereby contacts the winding wheel 88 as the capacitor is being wound. In this manner, the metallized dielectric material is always kept under tension and the formation of wrinkles and creases are minimized. By use of a relatively large winding wheel 88, a difference in thickness between the inner layer of the dielectric material, which is in contact with the periphery of the wheel 88 and the outer layer, which has to traverse a somewhat longer distance because of the thickness of the dielectric material that is being wound, is minimized. This substantially eliminates reflection of this difference (which is known as the "$2\pi t$ error" where t represents the thickness of a layer of the dielectric material) in length back into the metallized dielectric material being fed between the discs 46, 48, and 50 and the contact point 87 of the material with the winding wheel 88. The winding mandrel 100 is maintained in contact with the periphery of the winding wheel 88 during winding by means of a bias spring 112. Thus, the "$2\pi t$ error" that would otherwise occur at the mandrel is wound into the capacitor and not fed backward. One end of the bias spring 112 is secured to a bolt 114 which is attached to the frame 10 and the other end is secured to a hook 116 on a pivoted arm 118 which carries the mandrel 100.

A motor 120 to drive the mandrel 100 is mounted on the base 122 of the frame 10. The winding wheel 88 is driven by the dielectric material being pulled over it. It has a pulley 124 attached to its shaft 125 which drives a belt 126, which in turn drives a pulley 128 which is secured on a shaft 130, on which the pivot arm 118 pivots. A second belt 132, which is driven by the pulley 128, is coupled both to the idler pulley 134, which is supported by the bracket 136, and to the idler pulley 138, which is coupled to drive the split mandrel 100. A toggle mechanism 133 apparatus, is used which is a conventional belt tension for applying and releasing tension on the belt 132. Control unit 140 associated with the motor 120 controls the speed of the motor under control of a speed adjustment knob 142. An On/Off switch 144 is mounted near the bottom of the control unit 140. The indicator lights 146, 148 indicate when the machine is operating.

FIG. 4 illustrates an alternate version of the present invention in which the operation of the machine is identical to that previously described up to the point 87 where the dielectric material contacts the winding wheel 88. In the embodiment of FIG. 4, the split mandrel 100 is mounted in a fixed position and the unmetallized dielectric material is supplied from the wheel 108 over the idler rollers 150, 152, and 154 to the split mandrel 100. The major difference between the embodiments of FIG. 4 and FIG. 3, however, lies in the fact that a second winding wheel 156 is utilized which is supported by a pair of pivotally mounted arms 158, 160. In this embodiment the metallized dielectric material from the supply roll 22 passes underneath the winding wheel 88 and over the top of the winding wheel 156. The dielectric material from the wheel 88 is kept under tension until it reaches the point where the winding mandrel 100 is forced against the winding wheel 156. In this embodiment a bias spring 162 is connected with one end linked around a bolt 164 that is connected to the frame 10 with the other end of the spring being connected to a link 166 between the arms 158, 160, thereby biasing the winding wheel 156 against the winding mandrel 100 in a manner such that the wheel 156 will move to the right as the wound capacitor builds up on the mandrel 100, with the outer layer of the capacitor being maintained in contact with the winding wheel 156.

Figure 5:
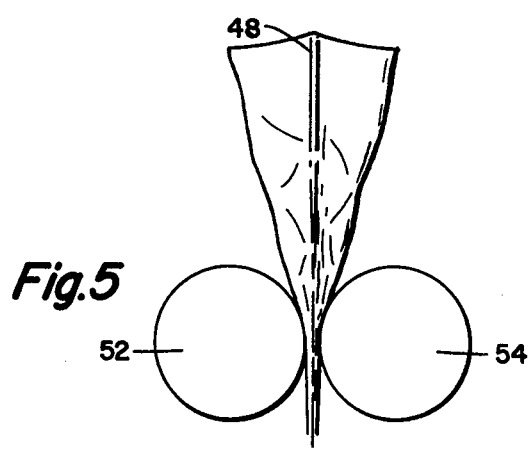
FIG. 5 is a diagramatic showing of an embodiment in which a single pleat is formed in a dielectric material.

Although the illustrated embodiments of FIGS. 1, 2, and 3 are directed to the use of three discs in order to provide a completed capacitor with three pleats, the present invention may be employed with varying number of discs, wherein the pleats are started at the discs and are completed at a relatively large diameter winding wheel around which the pleated material is pulled under tension. For example, in the partial diagramatic illustration of FIG. 5, only the disc 48 is employed and the metallized dielectric material passes between the idler roller wheels 52 and 54 on its way to the winding wheel (not shown). Although a pleated capacitor could be formed with single pleat without the use of the pleating disc 48 the edges of the pleated capacitor would not be clearly defined and these would be free to move relative to one another during the winding process. Thus, the use of the disc 48 allows the dielectric material to be maintained under tension and to be firmly locked upon the disc 48 so as to precisely locate the central pleat of the pleated and wound capacitor segment relative to the edges of the material. The pleating disc 48, therefore, provides a noticeable improvement in the manufacture of single pleated capacitors of different types; for example, over the type of capacitors shown in the L. W. Foster et al, U.S. Pat. No. 2,565,301, issued on Aug. 21, 1951, in which a single pleat manufacturing step was disclosed which did not use a pleating disc and, therefore, they have wandering edges.

Figure 6:
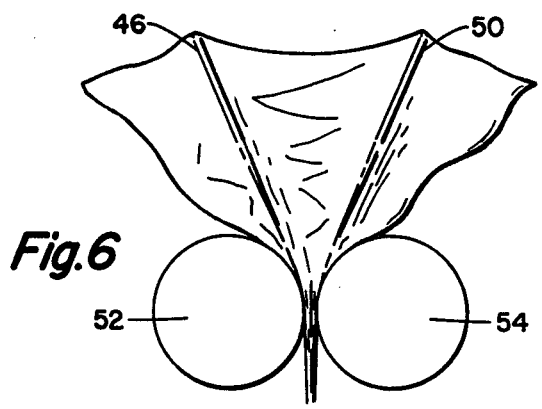
FIG. 6 is a diagramatic showing of an embodiment in which two pleats are formed in a dielectric material.

In the embodiment of FIG. 6, the disc 48 is removed but the angled discs 46 and 50 are retained so that a pleated capacitor is formed having two accurately located pleats corresponding to the location of the discs 46 and 50. While the embodiment of FIG. 5 would not require an air supply and the associated air tubes, the embodiment of FIG. 6 could effectively utilize an air supply and a single air tube directed to the area between the discs 46 and 50.

Figure 7:
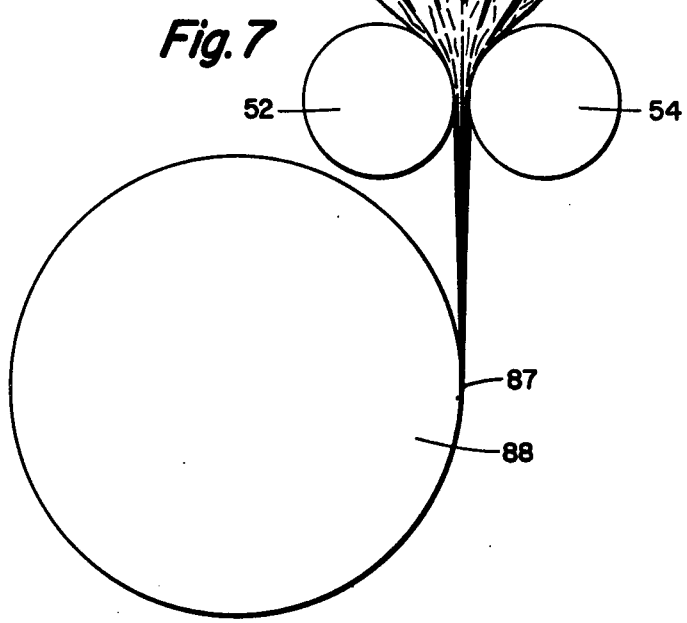
FIG. 7 is a diagramatic illustration of an embodiment in which five pleats are formed in a dielectric material which is then wound upon a winding wheel.

In the embodiment of FIG. 7, the manner in which the present invention may be extended to an odd number of pleats, greater than three, is shown. This is achieved by the addition of two additional pleating discs 47, 51 which are angled at a greater angle with respect to the central disc 48 than are the discs 46, 50. Of course, if an even number of pleats, such as four, were desired, the central disc could be removed from the embodiment of FIG. 7 to form another embodiment of the present invention. The dielectric material after passing through the idler roller wheels 52 and 54 contacts the winding wheel 88 at the point 87 in the embodiment of FIG. 7. In the embodiment of FIG. 7, an air supply and air supply tubes could advantageously be utilized to direct air against the surface of the dielectric material that lies between each pair of adjacent discs 46 and 47, 46 and 48, 48 and 50, and 50 and 51. It is also noted that the upwardmost point 62 of the center disc is higher than the uppermost points 63 of the discs 46, 50 while the points 63 are higher than the uppermost point 69, of the discs 47, 51 in order to keep the length of that portion of the dielectric material that passes over each of the discs substantially equal between the points 90 and 87, as previously mentioned.

In all of the previously described embodiments, it is noted that the metallized dielectric material is pulled tightly over the rotatable discs so that it is securely locked thereon, thereby accurately and continuously defining the outer edges of the capacitor segment and maintaining a precise location for the desired number of pleats. The placement of the rotatable discs all on one side of the dielectric material and so that the other discs are angled with respect to the center line of the dielectric material, and with respect to a central disc when one is used, provides for the pleating of the dielectric material in a very compact manner and with a minimization of surface damage to the metallized electrode surfaces of the capacitor. The illustrated machine also provides for the production of capacitors having a number of different pleats whereby the machine may be modified to produce capacitor segments having a different number of pleats in a quick and efficient manner merely by changing the number of discs that are employed. In addition, the adjustment provision of the machine for controlling the projection of the upper portion of the center disc beyond the upper projections of the other angled discs provides further versatility whereby capacitors may be formed either with the central pleat that is in alignment with the outer pleats of the capacitor, or with the central pleat projecting beyond the outer pleats, as illustrated in the previously mentioned Rayburn U.S. patent application Ser. No. 814,958.

It will be noted from the foregoing, that one of the major advantages of the present invention is that when two or more pleats are desired, that pleating may be accomplished by the location of discs all on one side of the metallized dielectric material, and therefore, in the described embodiment any damage that may occur is restricted to one side of the mentallized dielectric. Obviously, this feature may be of even greater advantage when other types of materials for other applications in which restriction of damage or wear to one side of the working material may be of critical importance. This advantage is achieved by provision of the outer discs such as the discs 46, 47, 50 and 51, wherein these discs are angled in pairs, with each disc being angled at the same angle as the other disc of the pair but in the opposite rotational sense, with respect to the center line of the dielectric material. The center line of the dielectric material, it is noted, is located along the disc 48 (FIG. 7), and substantially in alignment with the point 87 of the wheel 88.

What is claimed is:

1. A method of pleating continuously fed flexible sheet material with at least one creased pleat comprising the steps of pulling said sheet material under tension over a number of rotatable discs equal in number to the desired number of pleats of said sheet material so that one side of said sheet material is firmly locked onto the peripheries of said discs to initiate said pleats and passing said sheet material with said initiated, but not creased pleats, under tension around a portion of the periphery of a rotatable winding wheel so that said pleats are creased at the point where said sheet material initially contacts said wheel as a result solely of the tension applied to said flexible sheet material.

2. A method as claimed in claim 1 wherein at least one pair of rotatable discs are employed, with each disc of a pair being aligned at substantially equal acute angles, but in opposite rotational senses, from the center line of said sheet material, comprising the additional step of forcing the surface of said sheet material that lies between any two adjacent discs, toward said discs as said sheet material passes over said discs.

3. A method as claimed in claim 2 wherein said steps of forcing said surface of said sheet material toward said discs is achieved by directing a low pressure gas stream against said surface between each adjacent disc.

4. A method as claimed in claim 1 comprising the additional step of maintaining tension of said sheet material until said sheet material is received by a rotating winding means having substantially smaller diameter than said wheel so that said pleated sheet material is wound on said rotating winding means after being creased.

5. A method as claimed in claim 4 wherein at least one pair of rotatable discs are employed with each disc of a pair being aligned at substantially equal acute angles, but in opposite rotational senses, from the center line of said sheet material, comprising the additional step of forcing the surface of said sheet material that lies between any two adjacent ones of said discs toward said discs as said sheet material passes over said discs.

6. A method as claimed in claim 5 wherein said step of forcing said surface of said sheet material toward said discs is achieved by directing a low pressure gas stream against said surface between each adjacent disc.

7. A machine for pleating continuously fed flexible sheet material with at least one creased pleat comprising supply means for supplying said sheet material, a number of rotatable discs over which said sheet material is pulled under tension, the number of said rotatable discs being equal to the desired number of creased pleats of said sheet material, so that one side of said sheet material is firmly locked onto the peripheries of said discs to initiate said pleats, and a rotatable winding wheel a portion of the periphery of which receives said pleated sheet material under tension with said initiated, but not creased pleats, so that said pleats are creased at the point where said sheet material initially contacts said wheel as a result solely of the tension applied to said flexible sheet material.

8. A machine as claimed in claim 7 comprising at least one pair of rotatable discs wherein each disc of a pair is aligned at substantially equal acute angles, but in opposite rotational senses, from the center line of said sheet material.

9. A machine as claimed in claim 8 further comprising forcing means for forcing the surface of said sheet material that lies between any two adjacent discs, toward said discs as said sheet material passes over said discs.

10. A machine as claimed in claim 9 wherein said forcing means comprises means for directing a low pressure gas stream against said surface between each adjacent disc.

11. A machine as claimed in claim 7 comprising a center disc positioned substantially parallel to the center line of said sheet material.

12. A machine as claimed in claim 7 further comprising tension maintaining means for maintaining tension on said sheet material comprising a rotating winding means that receives the free end of said sheet material and has a substantially smaller diameter than said winding wheel so that said pleated sheet material is wound on said rotating winding means under tension after said pleats are creased.

13. A machine as claimed in claim 7 further comprising a guide means located between said discs and said winding wheel which receives said sheet material but does not crease said initiated pleats.

14. A machine as claimed in claim 11 comprising at lease one pair of rotatable discs wherein each disc of a pair is aligned at substantially equal acute angles, but in opposite rotational senses, from the center line of said sheet material.

15. A machine as claimed in claim 14 wherein each of said discs are positioned with respect to all of said other discs so as to insure that the lengths of the portions of said sheet material that pass over each of said discs are substantially equal between said supply means and said point on said winding wheel where said sheet material initially contacts said winding wheel; said positioning of said discs being accomplished by displacing each pair of discs from every other pair of discs and from said center disc.

16. A machine as claimed in claim 14 wherein said center disc is displaced relative to all of said other discs so as to provide a center pleat in said sheet material that projects beyond the other pleats of said sheet material.

17. A machine as claimed in claim 14 further comprising tension maintaining means for maintaining tension on said sheet material comprising a rotating winding means that receives the free end of said sheet material and has a substantially smaller diameter than said winding wheel so that said pleated sheet material is wound on said rotating winding means under tension after said pleats are creased.

18. A machine as claimed in claim 17 further comprising a guide means located between said discs and said winding wheel which receives said sheet material but does not crease said initiated pleats.

19. A machine as claimed in claim 18 further comprising forcing means for forcing the surface of said sheet material that lies between any two adjacent discs, toward said discs as said sheet material passes over said discs.

20. A machine as claimed in claim 19 wherein said forcing means comprises means for directing a low pressure gas stream against said surface between each adjacent disc.

21. A machine as claimed in claim 20 comprising a first micrometer controlled adjustment means for adjusting the spacing between each disc of a pair of discs.

22. A machine as claimed in claim 21 comprising a second micrometer controlled adjustment means for independently adjusting the point on the periphery of the center disc which contacts said sheet material relative to the points on the peripheries of said discs of said pairs of discs which contact said sheet material.

23. A machine as claimed in claim 22 wherein each of said discs are positioned with respect to all of said other discs so as to insure that the lengths of the portions of said sheet material that pass over each of said discs are substantially equal between said supply means and said point on said winding wheel where said sheet material initially contacts said winding wheel; said positioning of said discs being accomplished by displacing each pair of discs from every other pair of discs and from said center disc.

24. A machine as claimed in claim 23 wherein said center disc is displaced relative to all of said other discs so as to provide a center pleat in said sheet material that projects beyond the other pleats of said sheet material.

* * * * *